United States Patent
Kaiser

(10) Patent No.: US 8,520,255 B2
(45) Date of Patent: Aug. 27, 2013

(54) METHOD FOR INLINE COLOR REGULATION IN PRINTING MACHINES

(75) Inventor: Michael Kaiser, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 654 days.

(21) Appl. No.: 12/731,302

(22) Filed: Mar. 25, 2010

(65) Prior Publication Data

US 2010/0245869 A1  Sep. 30, 2010

(30) Foreign Application Priority Data

Mar. 25, 2009  (DE) .................. 10 2009 014 826

(51) Int. Cl.
*G06F 15/00* (2006.01)
*G03F 3/08* (2006.01)
*B41J 29/393* (2006.01)
*B41J 2/21* (2006.01)
*B41J 2/00* (2006.01)
*G03G 15/00* (2006.01)
*G03G 15/06* (2006.01)
*G03G 15/01* (2006.01)

(52) U.S. Cl.
USPC .............. 358/1.9; 358/518; 358/523; 347/19; 347/43; 347/110; 399/49; 399/72; 399/39

(58) Field of Classification Search
USPC .............. 358/518, 523; 347/19, 43; 399/49, 399/72, 39
See application file for complete search history.

(56) References Cited

U.S. PATENT DOCUMENTS

| 5,835,626 | A | 11/1998 | Huber et al. |
| 7,207,645 | B2* | 4/2007 | Busch et al. ................. 358/523 |
| 7,515,267 | B2 | 4/2009 | Ehbets et al. |
| 7,894,065 | B2 | 2/2011 | Kohlbrenner et al. |
| 8,154,761 | B2* | 4/2012 | Huber et al. .................. 358/1.9 |
| 2005/0093923 | A1* | 5/2005 | Busch et al. .................. 347/43 |
| 2007/0201065 | A1* | 8/2007 | Huber et al. .................. 358/1.9 |

(Continued)

FOREIGN PATENT DOCUMENTS

| CN | 101045373 A | 10/2007 |
| CN | 101654011 A | 2/2010 |

(Continued)

OTHER PUBLICATIONS

German Search Report dated Nov. 5, 2009.

*Primary Examiner* — Akwasi M Sarpong
(74) *Attorney, Agent, or Firm* — Laurence A. Greenberg; Werner H. Stemer; Ralph E. Locher

(57) ABSTRACT

A method for color measurement of printing materials produced in printing machines includes a first color measurement instrument in the printing machine measuring the color of printing materials, a second color measurement instrument outside the printing machine measuring the color of printing materials produced in the printing machine and a computer communicating with the instruments, storing nominal color values and regulating color in inking units of printing units with the first instrument based on deviations from the stored nominal color values, determined on the printing materials in the printing machine. Printing materials produced by the printing machine are recorded by the second instrument. The second instrument records deviations from an original based on the color measured values determined on printing materials. The computer calculates corrected nominal values based on the deviations recorded with the second instrument for the first instrument and uses them for color regulation by the first instrument.

10 Claims, 2 Drawing Sheets

(56) References Cited

U.S. PATENT DOCUMENTS

2007/0227389 A1 10/2007 Huber et al.
2008/0247770 A1* 10/2008 Morales et al. ................. 399/72
2008/0298825 A1* 12/2008 Huber et al. .................... 399/39
2009/0256087 A1* 10/2009 Engler et al. ............ 250/559.06
2010/0064922 A1 3/2010 Elter et al.

FOREIGN PATENT DOCUMENTS

| DE | 102004021599 A1 | 12/2005 |
|----|-----------------|---------|
| DE | 102006014657 A1 | 10/2007 |
| DE | 102007011344 A1 | 10/2007 |
| DE | 102007043103 A1 | 3/2009  |
| DE | 102007044758 A1 | 4/2009  |
| DE | 102008045661 A1 | 4/2009  |

* cited by examiner

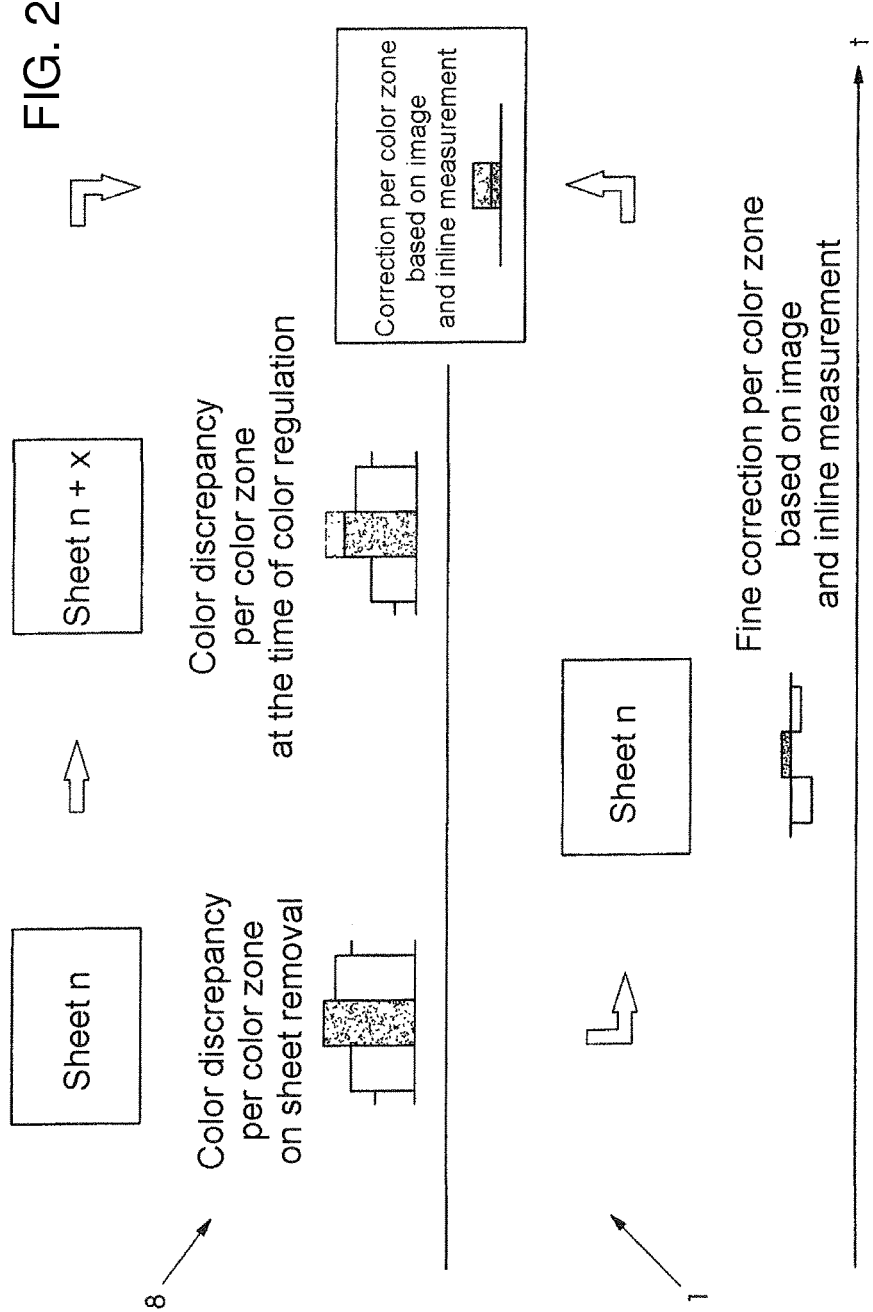

METHOD FOR INLINE COLOR REGULATION IN PRINTING MACHINES

CROSS-REFERENCE TO RELATED APPLICATION

This application claims the priority, under 35 U.S.C. §119, of German Patent Application DE 10 2009 014 826.4, filed Mar. 25, 2009; the prior application is herewith incorporated by reference in its entirety.

BACKGROUND OF THE INVENTION

Field of the Invention

The present invention relates to a method for color measurement of printing materials which are produced in printing machines, through the use of at least one first color measurement instrument which is disposed in the printing machine and measures the color of printing materials in the printing machine, at least one second color measurement instrument which is disposed outside the printing machine and measures the color of printing materials produced in the printing machine and a computer communicating with the first and second color measurement instruments.

Color measurement instruments for monitoring print quality are known from the prior art, in particular for printing materials printed on offset-rotary printing machines. The color measurement instruments are either disposed outside the printing machine or record the printing materials directly in the printing machine. The use of color measurement instruments serves to check for color deviations or discrepancies between printing materials and an original. If those deviations go outside a permissible tolerance band, the printing materials are waste, and cannot be sold. It is therefore important for the quality of the printing materials that are produced to be continuously monitored. Until now, separate color measurement instruments outside the printing machine which have generally been used for that purpose substantially include a measurement apparatus and a rest table. In that case, a so-called sample sheet is taken from the printing machine during the course of production, and is placed under the measurement instrument by the printer. The separate color measurement instruments are also referred to as offline measurement instruments, and have the disadvantage that only individual printing materials can be checked for color deviation, at relatively long time intervals. For that reason, so-called inline color measurement instruments have also been increasingly used in recent years, which are generally disposed in the last printing unit of the printing machine and are able to measure the color of each printing material directly in the printing machine. However, due to high production speeds, only sub-areas of a printing material can be checked at the moment, for which reason measurements are generally carried out only in the edge areas in the printing machine, where a so-called printing control strip is disposed. Printing control strips include color areas and register and/or matching marks, which are used to assess the print quality. In contrast, in the case of offline color measurement instruments, the measurement time is irrelevant, as a result of which the colors on the entire printed image can be measured in that case.

In order to combine the advantages of inline measurement and offline measurement with one another, attempts have been made in the meantime to use both inline and offline color measurement instruments for print quality control on a printing machine. One such configuration is disclosed, for example, in German Published, Non-Prosecuted Patent Application DE 10 2007 011 344 A1, corresponding to U.S. Patent Application Publication No. US 2007/0227389. In that case, two color measurement instruments are used for a sheet-fed rotary printing machine, with the first color measurement instrument being installed in the printing machine and recording a so-called color profile of the printing materials that are produced. Furthermore, a second color measurement instrument is provided, which is located outside the printing machine. The color measurement instrument in the printing machine is used to check the color profile and to find out when the printing machine is in a stable operating state. A stable operating state occurs when the color does not change, and the color profile is therefore constant. Once that stable operating state has been reached, the first color measurement instrument emits a signal. That may be a visual signal, as a result of which the printer then knows that the printing machine is in a stable operating state. Only then does the printer take a sample sheet from the printing machine, placing it under the second color measurement instrument outside the printing machine. This second color measurement instrument is then used to carry out an exact absolute color measurement on the sample sheet, with the measurement result being compared with the color values of the original. In the event of excessive deviations between the sample sheet and the original, a control action is carried out on the inking units in the printing machine. Since the first color measurement instrument in the printing machine has to monitor only the stable operating state, that is to say all that is necessary is to determine that the color has not changed, the first color measurement instrument need not measure colors in an absolute form, but only relatively. For that reason, lower-cost measurement sensors can be used in the first color measurement instrument in the printing machine.

However, the configuration known from German Published, Non-Prosecuted Patent Application DE 10 2007 011 344 A1, corresponding to U.S. Patent Application Publication No. US 2007/0227389, and the method described in that document have the disadvantage that, in the end, only the offline measurement instrument is used for color regulation. The inline color measurement instrument does not calculate any control actions, but merely determines that the stable operating state has been reached, or determines when the stable operating state is left again, specifically when the color profile has changed over a number of printing materials. The control actions in the inking units in the printing machine are, however, based exclusively on the nominal/actual value comparison of the offline color measurement instrument outside the printing machine. That leads to a slow, time-consuming control loop, since the printer can only take sample sheets from the printing machine at specific time intervals.

SUMMARY OF THE INVENTION

It is accordingly an object of the invention to provide a method for Inline color regulation in printing machines, which overcomes the hereinafore-mentioned disadvantages of the heretofore-known methods of this general type and which improves the joint use of inline color measurement instruments and offline color measurement instruments for assessment of print quality, with the aim of considerably reducing the time for color regulation.

With the foregoing and other objects in view there is provided, in accordance with the invention, a method for color measurement of printing materials produced in printing machines. The method comprises providing at least one first color measurement instrument disposed in the printing machine for measuring the color of printing materials in the printing machine, providing at least one second color measurement instrument disposed outside the printing machine for measuring the printing materials produced in the printing machine, providing a computer in communication with the first and second color measurement instruments, the computer storing nominal color values and carrying out color regulation in inking units of printing units in the printing machine with the first color measurement instrument as a function of deviations determined on the printing materials in the printing machine, from the stored nominal color values, at least from time to time, additionally recording printing materials produced by the printing machine with the second color measurement instrument disposed outside the printing machine, recording deviations from an original as a function of the color measured values determined on the printing materials with the second color measurement instrument, and calculating corrected nominal values on the basis of the deviations recorded with the second color measurement instrument for the first color measurement instrument disposed in the printing machine with the computer and using the corrected nominal values for color regulation by the first color measurement instrument.

The method according to the invention is particularly suitable for use with sheet-fed offset printing machines, in which sample sheets can be taken at specific time intervals. The printing machine has a first color measurement instrument, which is disposed as an inline color measurement instrument in the printing machine and at least partially measures the color of each printing material. Furthermore, a second color measurement instrument is disposed outside the printing machine, is in the form of an offline color measurement instrument, and at least partially measures the color in the printed image on sample sheets taken at time intervals. Additionally, the first and the second color measurement instruments are connected to a computer, which controls at least one of the two color measurement instruments and also ensures that data is interchanged between the color measurement instruments. The invention now provides for the computer to store nominal color values relating to the original, and to carry out measurements at least in subareas of the printing materials in the printing machine, through the use of the first color measurement instrument. The actual color values determined in this way are compared with the stored nominal color values, and any deviations are therefore recorded. If these deviations become excessive, then the computer or the inline color measurement instrument carries out a color regulation process in the inking units of the printing units of the printing machine. Furthermore, at least from time to time, the printing materials produced by the printing machine are also recorded by the second color measurement instrument, which is disposed outside the printing machine. The second color measurement instrument also measures at least parts of the printed image on the printing material, and compares the determined actual color values with the color values on the original. If unacceptable deviations are found in this case, then these deviations are sent to the computer, and the computer calculates corrected nominal color values for the first color measurement instrument which is disposed in the printing machine. The first color measurement instrument then uses these corrected nominal color values, or corresponding correction values, for future control processes. This has the major advantage that the regulation process is fundamentally carried out on the basis of the fast inline color measurement instrument, which records each printing material, with the nominal color values additionally being corrected or made more precise at least at time intervals by an exact measurement, which takes more time, by the second color measurement instrument outside the printing machine. This leads to the color regulation being more precise, without adversely affecting the advantages of the fast inline color measurement instrument, such as conversion time shortening, saving of waste, and continuous print monitoring of each printing material. The present invention therefore combines the advantages of an inline color measurement instrument and an offline color measurement instrument with one another.

In accordance with another mode of the invention, the computer is associated with the first color measurement instrument. The computer can be integrated in the first color measurement instrument. However, it is preferably the control computer for the printing machine, which also controls all of the processes in the printing machine. Since the first color measurement instrument is in the form of an inline color measurement instrument in the printing machine, it is actually also possible to use the control computer, provided for the printing machine, for this purpose.

In accordance with a further mode of the invention, the color regulation is carried out exclusively by nominal/actual value comparison in the first color measurement instrument. In this case, the regulation in the inking units is based exclusively on rapid recording of each printing material by the inline color measurement instrument. The second offline color measurement instrument is used only to check and to make more precise the nominal color values at specific time intervals. The regulation process itself is, however, based exclusively on the recording of the color measured values by the first color measurement instrument. This ensures that the color regulation can be carried out quickly.

In accordance with an added mode of the invention, the first color measurement instrument in the printing machine measures a printing control strip which is disposed on the printing materials. Due to the high production speed of offset rotary printing machines, recording of the entire printed image in the printing machine is either associated with extraordinary high costs for complex measurement sensors or the production speed must be correspondingly reduced, in such a way that the color of the printed image can be at least partially measured in the machine. However, both alternatives are uneconomical, which means that it is advantageous for the first color measurement instrument not to record the color in the image on the printing materials in the printing machine, but only to record the printing control strip, which is disposed in the side areas. This printing control strip has a limited number of color measurement areas, which can be recorded even at a high production speed by appropriate measurement heads of the inline color measurement instrument in the printing machine. There is also no need to measure the printing materials in the image since this is done at specific time intervals by the second measurement instrument, which is disposed outside the printing machine. Due to the long available measurement time, the offline color measurement instrument can at least partially measure the color on the printing material or in the entire printed image, comparing this with corresponding color values on the original. The deviations recorded in this way between the printing material and the original are then used to appropriately correct the nominal color values of the first color measurement instrument, in order to minimize the deviations, when the deviations are unacceptable.

In accordance with an additional mode of the invention, corrected nominal color measured values are created for each color zone on the printing material in the computer, on the basis of the nominal color measured values which have been recorded in the second color measurement instrument, which is disposed outside the printing machine, and has been measured in the printed image. Since the inking units in offset printing machines generally operate on a zonal basis, it is also appropriate to carry out the correction per color zone. These correction values are then transmitted to the inline color measurement instrument for each color zone of the printing unit in the printing machine.

In accordance with yet another mode of the invention, the first color measurement instrument compares the corrected nominal color measured values transmitted from the second color measurement instrument with those in the first color measurement instrument for the printing material that has been measured by both color measurement instruments, and appropriately corrects the stored nominal color values of the first color measurement instrument. The corrected nominal color measured values transmitted from the second color measurement instrument to the first color measurement instrument are therefore used as the basis for the correction of the nominal color measured values of the first color measurement instrument. The correction values for each color zone are preferably transmitted to the inline color measurement instrument for this purpose. The inline color measurement instrument then determines the color difference from the measured values, as recorded by the inline color measurement instrument, at the time at which the sample sheet was taken, and the currently recorded measured values by the inline color measurement instrument. This color difference is then additionally calculated with the correction values sent from the second color measurement instrument, and is sent as a resultant color deviation to the color regulator for the inking units.

In accordance with yet a further mode of the invention, during recording of printing materials, color differences formed by the first color measurement instrument between the detected actual color values and the corrected nominal color values are calculated in the computer, and are used to regulate the inking units in the printing units of the printing machine. In this embodiment, the color differences determined by the first color measurement instrument are not calculated by using correction values, but instead the nominal color values are first of all corrected, and the color difference between the corrected nominal color values and the actual color values is then determined, and is sent to the color regulators for the inking units, for regulation purposes. This can also be done separately for each color zone.

In principle, correction through the use of the color measured values from the offline color measurement instrument can be carried out in two different ways. In accordance with a concomitant mode of the invention, on one hand, it is possible for the second color measurement instrument to transmit a corrected absolute nominal color value to the first color measurement instrument. However, alternatively, it is also possible for the second color measurement instrument to send a relative nominal color value correction to the first color measurement instrument. Once again, both methods are preferably carried out for each color zone in the inking unit in the case of zonal color values, as a result of which correction values for each color zone are transmitted to the printing materials and to the inking units. These absolute or relative nominal color values are then either stored as new nominal color values in the inline color measurement instrument, or the color deviations recorded by the inline color measurement instrument are calculated with the relative or absolute nominal color values, for correction.

Other features which are considered as characteristic for the invention are set forth in the appended claims.

Although the invention is illustrated and described herein as embodied in a method for inline color regulation in printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a flow chart showing a regulation process by the inline color measurement instrument, including correction values from the offline color measurement instrument.

DETAILED DESCRIPTION OF THE INVENTION

Figure 1:
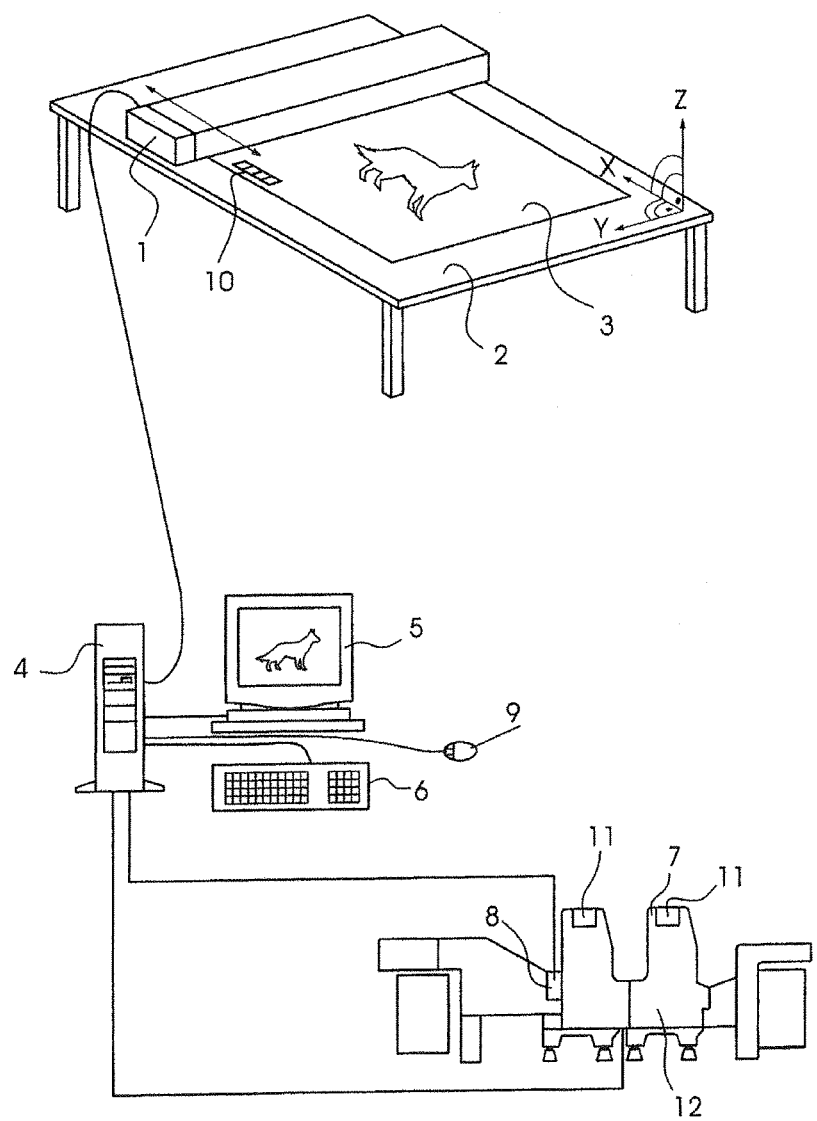
FIG. 1 is a diagrammatic, partly perspective and partly elevational view of a sheet-fed printing machine with an inline color measurement instrument and a connected offline color measurement instrument.

Referring now to the figures of the drawings in detail and first, particularly, to FIG. 1 thereof, there is seen an example of a sheet-fed rotary printing machine 12 with two printing units 7, each having an inking unit 11. The printing machine also has a feeder and a delivery for inputting and outputting printing material 3. An inline color measurement instrument 8 is disposed in the last printing unit 7, before the delivery, in the printing machine 12. This inline color measurement instrument 8 can measure the color of each printing material 3 in the printing machine 12, at least in an edge area, as a result of which the printed quality of each printing material 3 that is produced can be checked. The inline color measurement instrument 8 and the printing machine 12 are connected to a control computer 4. This control computer 4 has a screen 5 as well as a keyboard 6 and a computer mouse 9 for control purposes. A separate offline color measurement instrument 1 is also connected to the computer 4. This separate color measurement instrument 1 measures the printing material 3, which a printer takes from the delivery of the printing machine 12, at relatively long time intervals. The printer then places the printing material 3 on a measurement table 2, while the color measurement instrument 1 measures the color of the entire printed image. For this purpose, a scanning device moves over the entire printed image on the printing material 3, and compares recorded color measured values with a respective original for a current print job.

While the inline color measurement instrument 8 records each printing material 3 only in the edge area in a printing control strip 10 because of the high production speed, the separate color measurement instrument 1 measures the entire printed image over a large area on the printing material 3 placed on it. If deviations or discrepancies which the separate color measurement instrument 1 finds from the original are excessive, then appropriate correction values are calculated for each color zone of the printing material 3 and of the inking units 11 in the printing machine 12, and they are transmitted through the computer 4 to the inline color measurement instrument 8. Nominal/actual value deviations recorded by the inline color measurement instrument 8 in the printing machine on the printing control strips 10 on the printing materials 3 are then appropriately corrected by using these correction values, and the nominal/actual value deviations which have been corrected in this way are passed to a regulation process for the color in the inking units 11 for the respective printing units 7. The inking units 11 in the printing units 7 are in the form of zonal inking units and receive appropriate adjustment values for correction of the color, for each color zone. This results in a closed control loop, with the regulation process, that is to say the correction of the deviations between the color measured values recorded in the printing machine 12 and the nominal color measured values on the original, being carried out solely by the inline color measurement instrument 8. However, these nominal color values are corrected at specific time intervals by more precise nominal color values on the second, separate color measurement instrument 1. In this way, the advantages of fast color regulation by the inline color measurement instrument 8 and more precise measured value recording by the separate color measurement instrument 1 are linked to one another.

FIG. 2 describes the color regulation process in more detail. The upper half of the figure shows the regulation process through the use of the inline color measurement instrument 8, while the lower half of the figure shows the nominal color values being corrected on the basis of the measurement in the printed image by the separate color measurement instrument 1. The printer takes a sample sheet 3 from the printing machine 12 when the count is n and this is plotted on a time axis t. This sheet n is placed on the separate color measurement instrument 1 and its color in the image is measured. The color measured values determined in this way are then compared with corresponding presets from the original. In this case, deviations are determined for each color zone on the printing material 3. In parallel with this, the inline color measurement instrument 8 still carries out the color regulation on the basis of the previously available nominal color values for all of the sheets 3 following the sheet n. Once the measurement process has been completed by the separate color measurement instrument 1, the correction values from the separate color measurement instrument 1 are, however, additionally superimposed, from the printing material n+x, on the color deviations per color zone determined by the inline color measurement instrument 8. This means that the color deviations recorded by the inline color measurement instrument 8 are corrected on the basis of the more exact color measured values from the separate color measurement instrument 1. This is also done separately for each respective color zone, with all color deviations recorded by the inline color measurement instrument 8 after the sheet n+x being correspondingly corrected. After a further time interval, which is not shown herein, a sheet 3 is once again taken from the printing machine 12, and its color is measured on the separate color measurement instrument 1. If excessive deviations from the original are also found once again in this case, then a further fine correction per color zone is carried out by the separate color measurement instrument 1. This means that correspondingly changed correction values for each color zone are transmitted to the inline color measurement instrument 8 after this further time, and are appropriately calculated with the color deviations for each color zone, as found by the inline color measurement instrument 8. The procedure illustrated in FIG. 2 shows that the color regulation is in principle carried out on each printing material 3, on the basis of the nominal/actual value deviations determined by the inline color measurement instrument 8. In addition, a fine correction process is carried out by measurement of sample sheets 3 on the separate color measurement instrument 1 at specific time intervals. These fine correction values are then appropriately calculated with the future color deviations, as determined by the inline color measurement instrument 8.

The invention claimed is:

1. A method for color measurement of printing materials produced in printing machines, the method comprising the following steps:
    providing at least one first color measurement instrument disposed in the printing machine for measuring the color of printing materials in the printing machine;
    providing at least one second color measurement instrument disposed outside the printing machine for measuring the printing materials produced in the printing machine;
    providing a computer in communication with the first and second color measurement instruments, the computer storing nominal color values and carrying out color regulation in inking units of printing units in the printing machine with the first color measurement instrument as a function of deviations determined on the printing materials in the printing machine, from the stored nominal color values;
    at least from time to time, additionally recording printing materials produced by the printing machine with the second color measurement instrument disposed outside the printing machine;
    recording deviations from an original as a function of the color measured values determined on the printing materials with the second color measurement instrument; and
    calculating corrected nominal values on a basis of the deviations recorded with the second color measurement instrument for the first color measurement instrument disposed in the printing machine with the computer and using the corrected nominal values for color regulation by the first color measurement instrument.

2. The method according to claim 1, wherein the computer is associated with the first color measurement instrument.

3. The method according to claim 1, wherein the computer is a control computer for the printing machine.

4. The method according to claim 1, which further comprises carrying out the color regulation exclusively by nominal-actual value comparison in the first color measurement instrument.

5. The method according to claim 1, which further comprises measuring a printing control strip disposed on the printing materials with the first color measurement instrument in the printing machine.

6. The method according to claim 1, which further comprises creating nominal color measured values for each color zone on the printing material in the computer, which have been corrected on the basis of the color measured values measured in a printed image and recorded in the second color measurement instrument disposed outside the printing machine.

7. The method according to claim 1, wherein the first color measurement instrument compares the corrected nominal color measured values transmitted from the second color measurement instrument with those in the first color measurement instrument for the printing material that has been measured by both color measurement instruments, and appropriately corrects the stored nominal color values of the first color measurement instrument.

8. The method according to claim 7, which further comprises, during recording of printing materials, calculating color differences formed by the first color measurement instrument between detected actual color values and the corrected nominal color values in the computer, and using the color differences to regulate the inking units in the printing units of the printing machine.

9. The method according to claim 1, which further comprises sending a corrected absolute nominal color value from the second color measurement instrument to the first color measurement instrument.

10. The method according to claim 1, which further comprises sending a relative nominal color value correction from the second color measurement instrument to the first color measurement instrument.

* * * * *